(12) United States Patent
Dunn et al.

(10) Patent No.: US 7,774,821 B2
(45) Date of Patent: Aug. 10, 2010

(54) SYSTEM AND METHOD OF INSTALLING A NETWORK DEVICE

(75) Inventors: Kevin Dunn, Richardson, TX (US); Blaine Thomas, Allen, TX (US); Ty Robertson, Boerne, TX (US)

(73) Assignee: AT&T Intellectual Property I, L.P., Reno, NV (US)

( * ) Notice: Subject to any disclaimer, the term of this patent is extended or adjusted under 35 U.S.C. 154(b) by 256 days.

(21) Appl. No.: 11/856,524

(22) Filed: Sep. 17, 2007

(65) Prior Publication Data
US 2009/0077206 A1  Mar. 19, 2009

(51) Int. Cl.
*H04N 7/16* (2006.01)
(52) U.S. Cl. .................. 725/151; 709/217; 709/219; 709/220; 709/221
(58) Field of Classification Search ............. 709/223, 709/220, 221, 222, 224, 225
See application file for complete search history.

(56) References Cited

U.S. PATENT DOCUMENTS

| | | | |
|---|---|---|---|
| 2003/0204611 A1* | 10/2003 | McCosh et al. | 709/230 |
| 2007/0064714 A1 | 3/2007 | Bi et al. | |
| 2007/0101012 A1* | 5/2007 | Li et al. | 709/231 |
| 2007/0198718 A1* | 8/2007 | Savoor et al. | 709/226 |
| 2008/0077703 A1* | 3/2008 | Lee | 709/232 |
| 2008/0098089 A1* | 4/2008 | Luciani | 709/219 |
| 2008/0166105 A1* | 7/2008 | Vanderhoff | 386/124 |
| 2008/0168520 A1* | 7/2008 | Vanderhoff et al. | 725/131 |
| 2008/0307107 A1* | 12/2008 | Chen et al. | 709/231 |
| 2009/0013174 A1* | 1/2009 | Foti et al. | 713/151 |
| 2009/0063649 A1* | 3/2009 | Yamagishi | 709/207 |
| 2009/0070408 A1* | 3/2009 | White | 709/203 |
| 2009/0150526 A1* | 6/2009 | Wu | 709/220 |

* cited by examiner

*Primary Examiner*—Nathan Flynn
*Assistant Examiner*—Aftab Nasir Khan
(74) *Attorney, Agent, or Firm*—Toler Law Group (57) ABSTRACT

A method of installing a network device is disclosed that includes downloading installation data at a portable computing device from a communications provider server via an Internet Protocol (IP) network connection. The installation data includes a script that is adapted to establish IP connectivity between a first network device and at least a second network device. The method also includes determining, at the portable computing device, when the first network device is configured according to a communications provider specification while the portable computing device is disconnected from communicating with the communications provider server. The communications provider specification relates to providing at least one communications service to one or more customer premises. In addition, the method includes sending the script from the portable computing device to the first network device via the local connection after determining that the first network device is configured according to the communications provider specification.

23 Claims, 5 Drawing Sheets

SYSTEM AND METHOD OF INSTALLING A NETWORK DEVICE

FIELD OF THE DISCLOSURE

The present disclosure is generally related to systems and methods of installing a network device.

BACKGROUND

A device that is to be installed in a communications provider network may be configured at the factory or by a communications provider technician before the device is installed and adapted to communicate with other devices of the network. Problems with the configuration of a particular network device may not be detected until after the network device has been incorporated into the network and is used to provide communications services to subscriber premises. After the network device has been brought online, correcting errors in the configuration of a network device can be costly and time consuming. Hence, there is a need for an improved system and method of installing a network device.

DETAILED DESCRIPTION OF THE DRAWINGS

A portable computing device is disclosed that includes processing logic and memory accessible to the processing logic. The memory includes instructions executable by the processing logic to download a script from a video content provider server. The script is adapted to establish Internet Protocol (IP) connectivity between a network device and a group of set-top box devices. The memory also includes instructions executable by the processing logic to determine when the network device is configured according to a video content provider specification. In addition, the memory includes instructions executable by the processing logic to send the script to the network device via a local connection with the network device.

In another embodiment, a network device is disclosed that includes processing logic and memory accessible to the processing logic. The memory includes instructions executable by the processing logic to receive specification data from a portable computing device via a local connection between the network device and the portable computing device. The specification data identifies a video content provider specification associated with the network device. The memory also includes instructions executable by the processing logic to send data to the portable computing device indicating whether the network device is configured according to the video content provider specification. In addition, the memory includes instructions executable by the processing logic to receive installation data from the portable computing device. The installation data includes a script that is adapted to establish Internet Protocol (IP) connectivity between the network device and a plurality of additional network devices via an Internet Protocol Television (IPTV) network. Further, the memory includes instructions executable by the processing logic to configure the network device according to a video content provider specification before the network device has started to communicate with the plurality of additional network devices. The local connection between the network device and the portable computing device is independent of the IPTV network.

In another embodiment, a method of installing a network device is disclosed that includes downloading installation data at a portable computing device from a communications provider server via an Internet Protocol (IP) network connection. The installation data includes a script that is adapted to establish IP connectivity between a first network device and at least a second network device. The method also includes terminating the IP network connection between the portable computing device and the communications provider server. In addition, the method includes establishing a local connection between the first network device and the portable computing device. Further, the method includes determining, at the portable computing device, when the first network device is configured according to a communications provider specification while the portable computing device is disconnected from communicating with the communications provider server. The communications provider specification relates to providing at least one communications service to one or more customer premises. Additionally, the method includes sending the script from the portable computing device to the first network device via the local connection between the portable computing device and the first network device after determining that the first network device is configured according to the communications provider specification.

In another embodiment, a method of installing network device is disclosed that includes receiving installation data at a network device from a portable computing device. The installation data includes a script that is adapted to establish Internet Protocol (IP) connectivity between the network device and one or more set-top box devices via an Internet Protocol Television (IPTV) network. The script is unique to the network device and the installation data is related to configuring the network device according to a video content provider specification. The method also includes sending IP data from the network device to the one or more set-top box devices via the IPTV network.

In another embodiment, a computer-readable medium is disclosed having instructions to cause a processor to execute a method that includes downloading installation data at a portable computing device from a communications provider server via an Internet Protocol (IP) network connection and establishing a local connection between the first network device and the portable computing device. The installation data includes a script that is adapted to establish IP connectivity between a first network device and at least a second network device. In addition, the computer-readable medium has instructions to cause a processor to execute a method that includes determining, at the portable computing device, when the first network device is configured according to a communications provider specification while the portable computing device is disconnected from communicating with the communications provider server. The communications provider specification relates to providing at least one communications service to one or more customer premises. Further, the computer-readable medium has instructions to cause a processor to execute a method that includes sending the script from the portable computing device to the first network device via the local connection between the portable computing device and the first network device after determining that the first network device is configured according to the communications provider specification.

Figure 1:
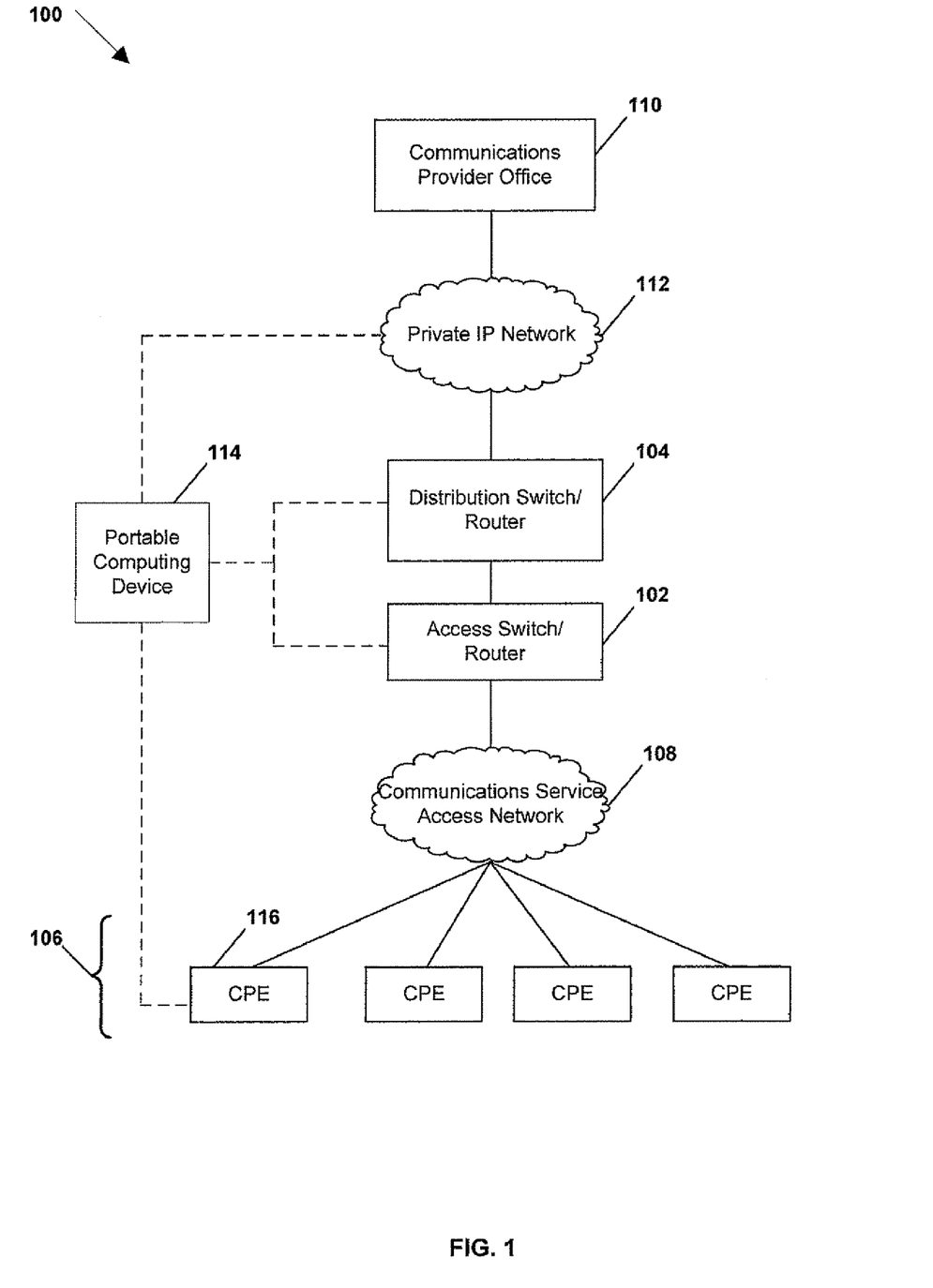
FIG. 1 is a block diagram of a particular embodiment of a system to install a network device.

FIG. 1 is a block diagram of a particular embodiment of a system 100 to install a network device. The system 100 relates to a communications provider network that provides a communications service, such an Internet Protocol Television (IPTV) service, to one or more subscriber premises.

The system 100 includes an access switch/router system 102 of a communications provider network. The access switch/router system 102 can include one or more servers, one or more routers, one or more switches, or any combination thereof. In an illustrative, non-limiting embodiment, the access switch/router system 102 may be located at a serving area interface of a communications provider network. The access switch/router system 102 communicates with a distribution switch/router system 104. The distribution switch/router system 104 can include one or more servers, one or more routers, one or more switches, or any combination thereof. In an illustrative, non-limiting embodiment, the distribution switch/router system 104 may be located at a central office facility of the communications provider network.

The access switch/router system 102 communicates with a group of customer premises equipment (CPE) units 106 via a communications service access network 108. The CPE units 106 may include a router, a local area network device, a modem, such as a digital subscriber line (DSL) modem or a cable modem, a residential gateway, any other suitable device that facilitates communication between the access switch/router system 102 and a subscriber premises, or any combination thereof. In an illustrative embodiment, each of the CPE units of the group of CPE units 106 may be adapted to provide one or more communications services to a respective subscriber premises. For example, a representative CPE unit 116 may be coupled to one or more set-top box devices (not shown) to provide IPTV service to a subscriber premise associated with the representative CPE unit 116.

The distribution switch/router system 104 may communicate with a communications provider office 110 via a private Internet Protocol (IP) network 112. The communications provider office 110 may include a national communications provider office, a regional communications provider office, a local communications provider office, or any combination thereof. The communications provider office 110 may include one or more servers adapted to manage providing a communications service to the group of CPE units 106. For example, the communications provider office 110 may receive or acquire video content, such as television content, movie content, advertisement content, other video content, or any combination thereof, from a satellite acquisition system, a satellite head-end office, one or more video on-demand (VOD) sources outside the IPTV network, such as movie studios and programmers of non-live content, or any combination thereof, to provide IPTV service to the group of CPE units 106. The communications provider office 110 may also be adapted to provide information related to installing network devices associated with the system 100. For example, the communications provider office 110 may include a communications provider server that provides data relating to the installation of routers, switches, servers, customer premises equipment units, set-top box devices, or any combination thereof, associated with the system 100.

A portable computing device 114 may be adapted to install devices of the system 100. For example, the portable computing device 114 may be adapted to configure and activate a device of the access switch/router system 102, a device of the distribution switch/router system 104, one or more of the CPE units 106, a set-top box device associated with a respective CPE unit, or any combination thereof, to provide a communications service to a number of subscriber premises. The portable computing device 114 may include a laptop computer, a hand-held computing device, a wireless handset, or any combination thereof. The portable computing device 114 may communicate with the communications provider office 110 via the private IP network 112. Further, the portable computing device 114 may communicate with a network device, such as a device of the distribution switch/router system 104, a device of the access switch/router system 102, one or more of the CPE units 106, a set-top box device associated with a respective CPE unit, or any combination thereof, via a local connection. For example, the portable computing device 114 may communicate with a network device via a local wireless connection, such as a Bluetooth or IEEE 802.11 connection, via a local wired connection, such as a DB9 connection or an Ethernet connection, or any combination thereof.

In a particular embodiment, the portable computing device 114 may be adapted to begin the process of installing one or more network devices associated with the system 100 by establishing an Internet Protocol (IP) connection with the communications provider office 110 via the private IP network 112. The IP connection may include a Remote Access Service (RAS) connection, a virtual private network (VPN) connection, an intranet connection, or any combination thereof. After establishing the IP connection with the communications provider office 110, the portable computing device 114 may download data related to installing one or more network devices associated with the system 100. The one or more network devices may be located at different locations of the communications provider network, at the same location of the communications provider network, or any combination thereof.

The portable computing device 114 may be adapted to download specification data related to the configuration of the one or more network devices from the communications provider office 110. The specification data may relate to a communications provider specification that identifies requirements specified by the communications provider for each of the one or more network devices before each network device begins communicating with other network devices in the communications provider network. For example, the specification data may identify a version of software to be executed by the one or more network devices, jumper settings related to the one or more network devices, expansion cards related to the one or more network devices, port configurations related to the one or more network devices, or any combination thereof.

The portable computing device 114 may also be adapted to download installation data from the communications provider office 110. The installation data may include data that is required to satisfy the communications provider specification, such as a version of software to be executed by the one or more network devices, a script that is adapted to establish Internet Protocol (IP) connectivity between the one or more network devices and additional network devices of the communications provider network, or any combination thereof. In an illustrative, non-limiting embodiment, the portable computing device 114 may be adapted to download a unique script for each of the one or more network devices to be installed.

After downloading the installation data, the portable computing device 114 may be adapted to establish a local connection with a particular network device that is to be installed, such as a switch of the access switch/router system 102. In an illustrative, non-limiting embodiment, the portable computing device 114 may terminate the IP connection with the communications provider office 110 before establishing the local connection with the network device that is to be installed.

In an illustrative embodiment, the network device to be installed may already be configured according to a particular specification. For example, a vendor may have configured the network device before sending the network device to the communications provider. To illustrate, a network device vendor may have configured the network device with a particular jumper settings arrangement, with particular expansion cards, with a particular version of software, or any combination thereof. In another example, a communications provider agent may have configured the network device according to a particular specification after the network device was deployed to the intended site, but before activating the network device to communicate with other devices of the communications provider network.

After establishing the local connection between the portable computing device 114 and the network device to be installed, the portable computing device 114 may be adapted to determine if the network device is configured according to the communications provider specification. For example, the portable computing device 114 may be adapted to identify that the network device is currently configured according to a particular specification and to determine if the current configuration matches the communications provider specification.

In an illustrative embodiment, the portable computing device 114 may determine that the network device is not configured according to the communications provider specification. The portable computing device 114 may be adapted to provide instructions specifying how to configure the network device according to the communications provider specification. For example, the portable computing device 114 may determine that the network device is configured with an expansion card that is not specified by the communications provider specification and the portable computing device 114 may provide instructions indicating a replacement expansion card that complies with the communications provider specification. In an illustrative, non-limiting embodiment, the portable computing device 114 is adapted to produce one or more graphical user interfaces indicating whether or not the network device is configured according to the communications provider specification, one or more graphical user interfaces indicating instructions to configure the network device according to the communications provider specification, or any combination thereof.

The portable computing device 114 may be adapted to initiate sending of a script to the network device after confirming that the network device has been configured according to the communications provider specification. The script may be adapted to establish Internet Protocol (IP) connectivity between the access switch and other devices of the communications provider network. After the script has been sent to the network device, the portable computing device 114 may determine if the script has been executed properly based on data received from the network device.

Once the portable computing device 114 confirms that the network device is configured according to the communications provider specification and that the script has been properly executed by the network device, the local connection between the portable computing device 114 and the network device may be terminated. The portable computing device 114 may then install another network device of the system 100. For example, a communications provider technician may transport the portable computing device 114 to another site to install another network device of the communications provider network. To illustrate, the communications provider technician may install a first access switch at a first communications provider serving area interface (SAI) and then travel to a second communications provider SAI to install a second access switch, the communications provider technician may install an additional access switch at the first SAI, or any combination thereof.

After the network device has been installed, the network device may be adapted to communicate with other devices of the system 100 to provide communications services to the CPE units 106. For example, an access switch of the access switch/router system 102 may be adapted to provide IPTV services to the representative CPE unit 116. To illustrate, the access switch 102 may receive data from the representative CPE unit 116 indicating a request by a set-top box device associated with the representative CPE unit 116 to join a multicast group associated with a particular television channel. The access switch 102 may be adapted to add the set-top box device to the multicast group associated with the particular channel or forward the join request to the distribution switch/router system 104. The access switch may also be adapted to receive IPTV data, such as video content data packets, after joining the multicast group associated with the requested television channel. The access switch 102 may forward the received video content data packets to the respective set-top box device via the representative CPE unit 116.

Figure 2:
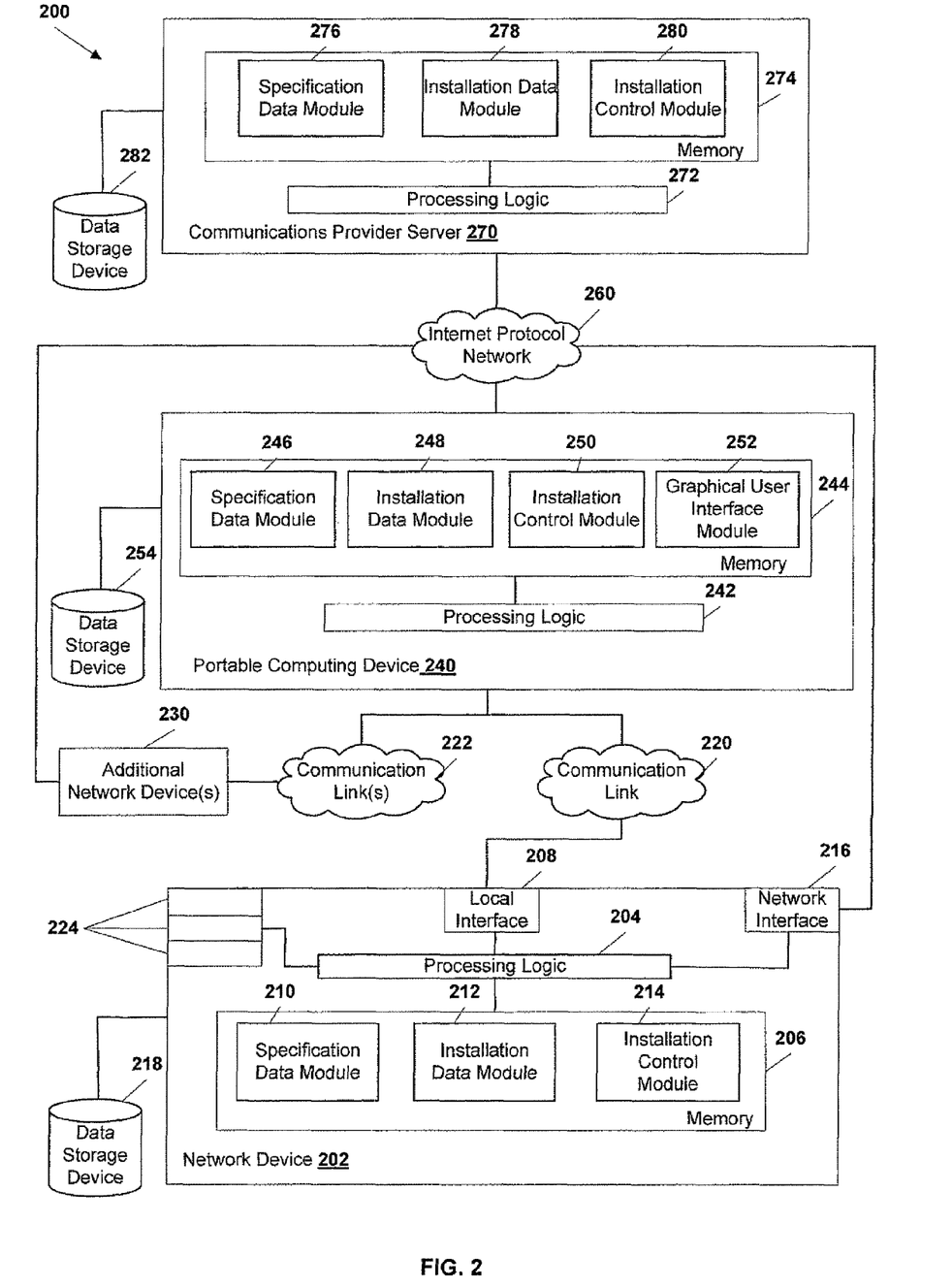
FIG. 2 is a block diagram of a second particular embodiment of a system to install a network device.

FIG. 2 is a block diagram of a second particular embodiment of a system 200 to install a network device. The system 200 includes a network device 202 that may communicate with a portable computing device 240 via a communication link 220. The communication link 220 may include a local wireless connection over a wireless network, a local wired connection over a coaxial cable or over an Ethernet cables, or any combination thereof. In an illustrative, non-limiting embodiment, the network device 202 may include a server, a router, a switch, a set-top box device, a customer premises equipment unit, or any combination thereof. The network device 202 may be associated with a data storage device 218 that it coupled to or integrated with the network device 202.

The network device 202 includes processing logic 204 and memory 206 that is accessible to the processing logic 204. In a particular embodiment, the processing logic 204 may communicate with the communication link 220 via a local interface 208. In an illustrative embodiment, the local interface 208 may include a wireless interface, such as a Bluetooth or IEEE 802.11 interface, a wired interface, such as a DB9 or Ethernet cable interface, or any combination thereof. In an illustrative, non-limiting embodiment, the processing logic 204 may communicate with the portable computing device 240 via the communication link 220 according to Trivial File Transfer Protocol (TFTP).

The network device 202 may also communicate with an Internet Protocol (IP) network 260 via a network interface 216. The IP network 260 may include a public IP network, a private IP network, such as a communications provider private IP network, or any combination thereof. The network device 202 may communicate with a communications provider server 270, with one or more additional network devices 230, or any combination thereof, via the Internet Protocol network 260. The one or more additional network devices 230 may include one or more servers, one or more switches, one or more routers, one or more customer premises equipment units, one or more set-top box devices, or any combination thereof.

Additionally, the network device 202 includes a plurality of expansion card slots 224 that are coupled to the processing logic 204. Each of the plurality of expansion card slots 224 may be adapted to support a respective expansion card that is adapted to provide a communications service to one or more subscriber premises. For example, the plurality of expansion card slots 224 may include a first expansion card that is adapted to communicate Internet Protocol Television (IPTV) data with the communications provider server 270, a second expansion card that is adapted to provide IPTV service to the one or more subscriber premises, or any combination thereof.

In a particular embodiment, the memory 206 includes a specification data module 210 that is executable by the processing logic 204 to communicate information related to installing the network device 202. In an illustrative embodiment, the specification data module 210 is executable by the processing logic 204 to send specification data to the portable computing device 240 to indicate a current configuration of the network device 202. For example, the specification data sent to the portable computing device 240 may identify a current version of software stored at the network device 202, a current jumper settings arrangement of the network device 202, an identifier associated with an expansion card included in the network device 202, or any combination thereof.

The specification data module 210 may also be executable by the processing logic 204 to receive specification data from the portable computing device 240 indicating a communications provider specification for the network device 202. The communications provider specification may relate to providing at least one communications service to one or more subscriber premises via the network device 202. For example, the specification data may relate to a version of software instructions, a jumper settings arrangement, an expansion card, or any combination thereof, specified by the communications provider for a serving area interface (SAI) switch to provide a High Speed Internet service, a Voice over Internet Protocol (VoIP) service, an Internet Protocol Television (IPTV) service, or any combination thereof, to one more subscriber premises.

The specification data module 210 may be executable by the processing logic 204 to determine if the network device 202 is configured according to the communications provider specification. For example, the specification data module 210 may be executable by the processing logic 204 to compare the current configuration of the network device 202 with the communications provider specification. When the current configuration of the network device 202 matches the communications provider specification, the specification data module 210 is executable by the processing logic 204 to send data to the portable computing device 240 indicating that the network device 202 is configured according to the communications provider specification. When the current configuration of the network device 202 does not match the communications provider specification, the specification data module 210 may be executable by the processing logic 204 to send data to the portable computing device 240 indicating that the current configuration of the network device 202 does not match the communications provider specification. In addition, the specification data module 210 may be executable by the processing logic 204 to store specification data related to the current configuration of the network device 202, to store data related to the communications provider specification, or any combination thereof, at the data storage device 218.

In a particular embodiment, the memory 206 includes an installation data module 212 that is executable by the processing logic 204 to receive installation data from the portable computing device 240. The installation data may relate to configuring the network device 202 according to the communications provider specification, to activating the network device 202 to communicate via the Internet Protocol network 260, or any combination thereof. The installation data may include a version of software specified by the communications provider specification, a script adapted to establish Internet Protocol (IP) connectivity between the network device 202 and at least one other device of the system 200, or any combination thereof.

In an illustrative embodiment, the script is adapted to establish IP connectivity between the network device 202 and the one or more additional network devices 230, between the network device 202 and the communications provider server 270, or any combination thereof. In an illustrative, non-limiting embodiment, the script is unique to the network device 202 because the script is only adapted to establish IP connectivity for a particular network device. For example, the script may identify the devices of the system 200 that are intended to communicate with the network device 202 via the Internet Protocol network 260, the script may identify information related to providing a communications services to the devices, the script may identify an IP address assigned to the network device 202, or any combination thereof The installation data module 212 may also be executable by the processing logic 204 to store installation data at the data storage device 218.

In an illustrative embodiment, the installation data module 212 is executable by the processing logic 204 to send a request to the portable computing device 240 for installation data. For example, the installation data module 212 may be executable by the processing logic 204 to send a request to the portable computing device 204 for installation data that is needed to configure the network device 202 according to the communications provider specification, such as a request for a specified version of software, after determining that the network device 202 is not configured according to the communications provider specification.

In a particular embodiment, the memory 206 includes an installation control module 214 that is executable by the processing logic 204 to manage the installation of the network device 202. In an illustrative embodiment, the installation control module 214 is executable by the processing logic 204 to configure the network device 202 according to the communications provider specification. For example, the installation control module 214 may be executable by the processing logic 204 to install a version of software specified by the communications provider specification. In addition, the installation control module 214 may be executable by the processing logic 204 to activate the network device 202 to communicate with the one or more additional network devices 230, the communications provider server 270, or any combination thereof, via the Internet Protocol network 260 by executing a script received from the portable computing device 240.

The installation control module 214 may also be executable by the processing logic 204 to provide data to the portable computing device 240 related to the progress of installing the network device 202. For example, the installation control module 214 may be executable by the processing logic 204 to provide data to the portable computing device 214 indicating an amount of installation data that has been downloaded to the network device 202 relative to a total amount of installation data to be downloaded. In another example, the installation control module 214 may be executable by the processing logic 204 to provide data to the portable computing device 240 indicating that the network device 202 has been configured according to the communications provider specification, indicating that the network device 202 has been activated to communicate via the Internet Protocol network 260, or any combination thereof. The installation control module 214 may be executable by the processing logic 204 to provide the installation progress data to the portable computing device 240 automatically or in response to a request from the portable computing device 240.

Further, the installation control module 214 may be executable by the processing logic 204 to stop installing the network device 202 before the installation process is complete. To illustrate, the installation control module 214 may be executable by the processing logic 204 to stop installing the network device 202 in response to receiving a stop installing command from the portable computing device 240. In addition, the installation control module 214 may be executable by the processing logic 204 to resume installing the network device 202 after receiving a resume installing command from the portable computing device 240. The configuration control module 214 may be executable by the processing logic 204 to resume configuring the network device 202 at the point where the installation process was stopped, at a specified point of the installation process, or any combination thereof.

In a particular embodiment, the portable computing device 240 includes processing logic 242 and a memory 244 that is accessible to the processing logic 242. In addition, the portable computing device 240 is associated with a data storage device 254 that may be coupled to or integrated with the portable computing device 240.

The portable computing device 240 may communicate with the network device 202 via the communication link 220 and the portable computing device 240 may communicate with the one or more additional network devices 230 via one or more respective communication links 222. The portable computing device 240 may also communicate with a communications provider server 270 via the Internet Protocol network 260. In an illustrative, non-limiting embodiment, the portable computing device 240 may not be adapted to maintain a connection with the communications provider server 270 via the Internet Protocol network 260 while concurrently maintaining a local connection to install the network device 202 via the communication link 220, while concurrently maintaining a local connection to install the one or more additional network device 230 via the respective communication links 222, or any combination thereof. For example, the portable computing device 240 may be adapted to support a dynamic host configuration protocol (DHCP) server that is associated with installing the network device 202, the one or more additional network devices 230, or any combination thereof, but that is not executable while the portable computing device 240 maintains a connection with the communications provider server 270.

The memory 244 includes a specification data module 246 that is executable by the processing logic 242 to communicate specification data with the network device 202, the communications provider server 270, the one or more additional network devices 230, or any combination thereof For example, the specification data module 246 may be executable by the processing logic 242 to receive specification data from the communications provider server 270 indicating a communications provider specification associated with the network device 202. In addition, the specification data module 246 may be executable by the processing logic 242 to send specification data to the network device 202 identifying the communications provider specification.

The specification data module 246 may also be executable by the processing logic 242 to receive specification data from the network device 202 indicating a current configuration of the network device 202. In an illustrative embodiment, the specification data module 246 is executable by the processing logic 242 to determine if the network device 202 is configured according to the communications provider specification. For example, the specification data module 246 may be executable by the processing logic 242 to determine if the network device 202 is configured according to the communications provider specification by comparing the current configuration of the network device 202 to the communications provider specification. To illustrate, the specification data module 246 may be executable by the processing logic 242 to compare a specified version of software to a version of software stored at the network device 202, by comparing the specified jumper settings arrangement to a jumper settings arrangement of the network device 202, by comparing the specified expansion card identifier to an expansion card identifier of the network device 202, or any combination thereof. The specification data module 246 may also be executable by the processing logic 242 to identify errors in the current configuration of the network device 202 based on the communications provider specification, such as determining that an expansion card is installed in the wrong expansion card slot of the network device 202, that the network device 202 is assigned the wrong IP address, or any combination thereof.

Additionally, the specification data module 246 may be executable by the processing logic 242 to determine how to change the current configuration of the network device 202 to match the communications provider specification. For example, the specification data module 246 may be executable by the processing logic 242 to determine that a particular expansion card of the network device 202 needs to be replaced, that the jumper settings of the network device 202 need to be modified, that a different version of software needs to be installed on the network device 202, or any combination thereof, for the network device 202 to be configured according to the communications provider specification.

Further, the specification data module 246 may be executable by the processing logic 242 to send data to the communications provider server 270 indicating that the network device 202 is configured according to the communications provider specification, that the network device 202 is not configured according to the communications provider specification, or any combination thereof. The specification data module 246 may be adapted to store data indicating that the network device 202 is configured according to the communications provider specification, to store data indicating that the network device 202 is not configured according to the communications provider specification, to store data related to the communications provider specification, or any combination thereof; at the data storage device 254.

The memory 244 includes an installation data module 248 that is executable by the processing logic 242 to communicate installation data with the communications provider server 270, the network device 202, the one or more additional network devices 230, or any combination thereof. In an illustrative embodiment, the installation data module 248 may be executable by the processing logic 242 to receive installation data from the communications provider server 270. For example, the installation data module 248 may be executable by the processing logic 242 to receive installation data after sending a request to the communications provider server 270 relating to installation data associated with the network device 202, the one or more additional network device 230, or any combination thereof. To illustrate, the installation data module 248 may be executable by the processing logic 242 to receive one or more scripts, a version of software specified by a communications provider specification, or any combination thereof, after sending a request to the communications provider server 270 related to installation data associated with the network device 202.

The one or more scripts may be unique to the network device 202 and adapted to establish Internet Protocol (IP) connectivity between the network device 202 and the one or more additional network devices 230, between the network device 202 and the communications provider server 270, or any combination thereof. The one or more unique scripts may include information related to providing a communications service to one or more subscriber premises associated with the network device 202, identity the devices that the network device 202 is assigned to communicate with to provide the communications service, or any combination thereof. For example, the network device 202 may be an access switch of an IPTV network and the one or more unique scripts may identify the set-top box devices that are to receive IPTV service via the access switch and the one or more scripts may include information related to providing the IPTV service to the set-top box devices.

In addition, the one or more scripts received at the portable computing device 240 may depend on the functionality at the network device 202. For example, if the network device 202 is a switch, the portable computing device 240 may receive a first script, if the network device 202 is a router, the portable computing device 240 may receive a second script, if the network device 202 is a set-top box device, the portable computing device 240 may receive a third script, and if the network device 202 is a customer premises equipment unit, the portable computing device 240 may receive a fourth script. In addition, if the network device 202 is associated with a plurality of functionalities, such as a routing functionality and a switching functionality, the portable computing device 240 may receive a script related to the plurality of functionalities, a plurality of scripts, each associated with a respective functionality, or any combination thereof.

The installation data module 248 may also be executable by the processing logic 242 to upload installation data to the communications provider server 270 after a particular network device has been installed. For example, the installation data module 248 may be executable by the processing logic 242 to upload a unique script that is adapted to establish Internet Protocol connectivity between the Internet Protocol network 260 and the network device 202 to the communications provider server 270 after the network device 202 has been installed. In an illustrative, non-limiting embodiment, the installation data module 248 is executable by the processing logic 242 to erase data related to the script from a memory device of the portable computing device 240, such as the data storage device 254, after the script has been uploaded to the communications provider server 270.

The installation data module 248 may also be executable by the processing logic 242 to send installation data to the network device 202. The installation data may relate to configuring the network device 202 according to a communications provider specification, to activating the network device 202 to communicate via the Internet Protocol network 260, or any combination thereof. The installation data module 248 may be executable by the processing logic 242 to send the installation data to the network device 202 in response to receiving a request for installation data from the network device 202. In addition, the installation data module 248 may be executable by the processing logic 242 to send the installation data to the network device 202 in response to receiving data indicating that the network device 202 is configured according to the communications provider specification or in response to receiving data indicating that the network device 202 is not configured according to the communications provider specification. For example, the installation data module 248 may be executable by the processing logic 242 to send a version of software specified by the communications provider specification to the network device 202 in response to receiving data indicating that the network device 202 includes a version of software that is not specified by the communications provider specification. In another example, the installation data module 248 is executable by the processing logic 242 to send a script adapted to establish Internet Protocol connectivity to the network device 202 in response to receiving data indicating that the network device 202 is configured according to the communications provider specification.

In a particular embodiment, the memory 244 includes an installation control module 250 that is executable by the processing logic 242 to manage the installation of the network device 202, the one or more additional network devices 230, or any combination thereof. For example, the installation control module 250 may be executable by the processing logic 242 to receive data from the network device 202 indicating the progress of installing the network device 202. To illustrate, the installation control module 250 may be executable by the processing logic 242 to automatically receive data relating to the installation of the network device 202 from the network device 202 throughout the installation process, to receive data relating to the installation of the network device 202 from the network device 202 in response to a request sent from the portable computing device 240 to the network device 202, or any combination thereof.

In addition, the installation control module 250 may be executable by the processing logic 242 to send data to the communications provider server 270 relating to the progress of the installation of the network device 202. For example, the installation control module 250 may be executable by the processing logic 242 to send data to the communications provider server 270 indicating that the installation of the network device 202 is complete. The installation control module 250 may also be adapted to store data related to the installation of the network device 202 at the data storage device 254. In an illustrative, non-limiting embodiment, the installation control module 250 is executable by the processing logic 242 to generate a report related to the installation of the network device 202.

The installation control module 250 may be executable by the processing logic 242 to send a stop installing command to the network device 202 to stop the installation of the network device 202. The installation control module 250 may also be executable by the processing logic 242 to send a resume installing command to the network device 202 to resume the installation of the network device 202. In an illustrative, non-limiting embodiment, the installation control module 250 is executable by the processing logic 242 to store an indicator specifying the place in the installation process where the stop configuring command was sent and the installation control module 250 may be executable by the processing logic 242 to resume installing the network device 202 at the point of the installation process specified by the indicator.

In a particular embodiment, the memory 244 includes a graphical user interface (GUI) module 252 that is executable by the processing logic 242 to provide one or more graphical user interfaces related to the installation of the network device 202, the one or more additional network devices 230, or any combination thereof. For example, the GUI module 252 may be executable by the processing logic 242 to provide one or more graphical user interfaces related to establishing a connection with the communications provider server 270 via the Internet Protocol network 260, related to establishing a local connection with the network device 202 via the communication link 220, or any combination thereof. In another example, the GUI module 252 may be executable by the processing logic 242 to provide one or more graphical user interfaces related to downloading a unique script associated with establishing Internet Protocol connectivity for the network device 202, one or more unique scripts associated with establishing Internet Protocol connectivity for each of the respective one or more additional network devices 230, or any combination thereof, from the communications provider server 270.

Further, the GUI module 252 may be executable by the processing logic 242 to provide one or more graphical user interfaces related to downloading other information that may be needed to install the network device 202, the one or more additional network device 230, or any combination thereof For example, the GUI module 252 may be executable by the processing logic 242 to provide a graphical user interface related to downloading a communications provider specification, a graphical user interface related to downloading a version of software specified by a communications provider specification, or any combination thereof. The GUI module 252 may also be executable by the processing logic 242 to provide one or more graphical user interfaces related to uploading data to the communications provider server 270 after the installation process is complete, such as checking in a script that was downloaded by the portable computing device 240 to install a particular network device.

Additionally, the GUI module 252 may be executable by the processing logic 242 to provide one or more graphical user interfaces relating to the progress of the installation process at a particular network device. In an illustrative embodiment, the GUI module 252 may be executable by the processing logic 242 to provide graphical user interfaces related to configuring the network device 202 according the communications provider specification. For example, the graphical user interface module 252 may be executable by the processing logic 242 to provide one or more graphical user interfaces indicating that the network device 202 is configured according to the communications provider specification or indicating that the network device 202 is not configured according to the communications provider specification.

In addition, the GUI module 252 may be executable by the processing logic 242 to provide one or more graphical user interfaces indicating those items associated with a current configuration of the network device 202 that match corresponding items of the communications provider specification, indicating items associated with the current configuration of the network device 202 that do not match corresponding items of the communications provider specification, or any combination thereof. To illustrate, the GUI module 252 may be executable by the processing logic 242 to provide a graphical user interface indicating that the current jumper settings arrangement of the network device 202 matches the jumper settings arrangement specified by the communications provider specification, but that a current version of software associated with an expansion card of the network device 202 does not match the communications provider specification. Further, after receiving an indication that the network device 202 is not configured according to the communications provider specification, the GUI module 252 may be executable by the processing logic 242 to provide one or more graphical user interfaces that include instructions relating to how to configure the network device 202 according to the communications provider specification, such as a graphical user interface indicating that a version of software specified by the communications provider specification should be downloaded to replace a current version of software stored at the network device 202.

In an illustrative, non-limiting embodiment, the GUI module 252 is executable to provide one or more graphical user interfaces including one or more quality checklists related to installing a particular network device. For example, the GUI module 252 may be executable by the processing logic 242 to provide a graphical user interface that includes a first quality checklist that it is to be completed by a technician assigned to install a particular network device before the installation process has begun. The first quality checklist may include an item relating to confirming that high voltage is not present near the particular network device, an item relating to insuring that any vendor work associated with the particular network device has been completed, or any combination thereof. In addition, the GUI module 252 may be executable by the processing logic 242 to provide a graphical user interface that includes a second quality checklist to be completed by a technician assigned to install a particular device before leaving the communications provider site where a particular network device is located. The second quality checklist may include an item that relates to connecting an alarm cable, an item that relates to insuring that activated alarms provide the correct indications and correspond to the expected results, or any combination thereof.

In a particular embodiment, the communications provider server 270 includes processing logic 272 and memory 274 accessible to the processing logic 272. The communications provider server 270 may be coupled to or integrated with a data storage device 282. The memory 274 includes a specification data module 276 that is executable by the processing logic 272 to communicate specification data with the portable computing device 240. The specification data may relate to a communications provider specification relating to the configuration of a network device, such as the network device 202, the one or more additional network devices 230, or any combination thereof.

In an illustrative embodiment, the specification data module 276 may be executable by the processing logic 272 to send specification data to the portable computing device 240 indicating a configuration associated with the network device 202 specified by a communications provider. The specification data module 276 may also be executable by the processing logic 272 to receive specification data from the portable computing device 240 indicating a current configuration of the network device 202, indicating when the network device 202 has been configured according to the communications provider specification, or any combination thereof. Further, the specification data module 276 may be adapted to store the specification data at the data storage device 282.

In a particular embodiment, the memory 274 includes an installation data module 278 that is executable by the processing logic 272 to communicate installation data with the portable computing device 240. In an illustrative embodiment, the installation data module 278 is executable by the processing logic 272 to send a version of software specified by the communications provider specification to the portable computing device 240. In addition, the installation data module 278 may be executable by the processing logic 272 to send a script related to the network device 202, related to the one or more additional network devices 230, or any combination thereof, to the portable computing device 240. The script may be adapted to establish Internet Protocol (IP) connectivity between the network device 202 and the one or more additional network devices 230, between the network device 202 and the communications provider server 270, between the one or more additional network devices 230 and the communications provider server 270, or any combination thereof.

In an illustrative embodiment, the installation data module 278 is executable by the processing logic 272 to send one or more unique scripts to the portable computing device 240 in response to receiving one or more requests from the portable computing device 240 related to the one or more unique scripts. For example, the installation data module 278 may be executable by the processing logic 272 to receive a request from the portable computing device 240 relating to a unique script associated with the network device 202, one or more unique scripts that are each associated with a respective additional network device of the one or more additional network devices 230, or any combination thereof.

In an illustrative, non-limiting embodiment, when the network device 202 and each of the additional network devices 230 are associated with a unique script, the installation data module 278 may be executable by the processing logic 272 to download a particular unique script to only one portable computing device. For example, the installation control module 278 is executable by the processing logic 272 to send an error message to the portable computing device 240 upon receiving a request from the portable computing device 240 relating to a unique script that has already been downloaded to another portable computing device.

In another illustrative, non-limiting embodiment, the installation data module 278 is executable by the processing logic 272 to send data to the network device 202 via the Internet Protocol network 260. For example, the installation data module 278 may be executable by the processing logic 272 to send software updates to the network device 202 via the Internet Protocol network 260 after the network device 202 has been installed and is adapted to support IP connectivity with the communications provider server 270.

In a particular embodiment, the memory 274 includes an installation control module 280 that is executable by the processing logic 272 to manage the installation of the network device 202, the one or more additional network devices 230, or any combination thereof. In an illustrative embodiment, the installation control module 280 may be executable by the processing logic 272 to receive data from the portable computing device 240 relating to the installation process at the network device 202. The installation control module 280 may be executable by the processing logic 272 to receive data from the portable computing device 240 related to the installation of the network device 202 while the network device 202 is being installed, after the network device 202 has been installed, or any combination thereof. Additionally, the installation control module 280 may be executable by the processing logic 272 to verify that the network device 202 has been installed correctly based on data received from the portable computing device 240 related to the installation of the network device 202. In addition, the installation control module 278 may be executable by the processing logic 272 to communicate data with the network device 202 via the Internet Protocol network 260 relating to completing the installation of the network device 202 after receiving data from the portable computing device 240 indicating a partial installation of the network device 202.

For ease of explanation, the various modules 210-214, 246-252, and 276-280 have been described in terms of processor-executable instructions. However, those skilled in the art will appreciate that such modules can be implemented as hardware logic, processor-executable instructions, or any combination thereof.

Figure 3:
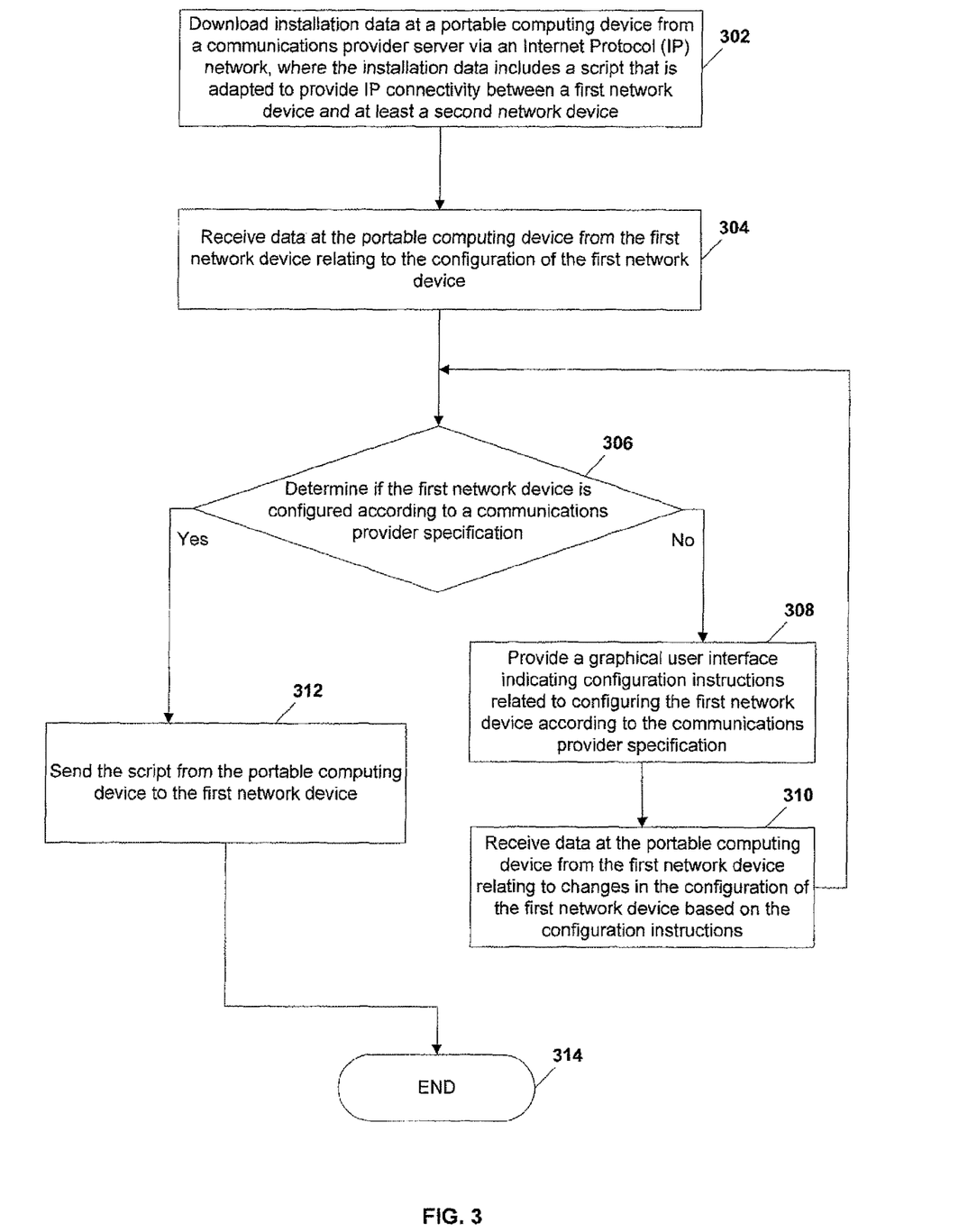
FIG. 3 is a flow diagram of a particular embodiment of a method of installing a network device.

FIG. 3 is a flow diagram of a particular embodiment of a method of installing a network device. At block 302, installation data is downloaded at a portable computing device from a communications provider server via an Internet Protocol (IP) network. The installation data may include a script that is adapted to provide IP connectivity between a first network device and a second network device. The first network device and the second network device may include a router, a switch, a server, a set-top box device, customer premises equipment, or any combination thereof. In an illustrative, non-limiting embodiment, the IP network connection between the portable computing device and the communications provider server may be terminated after downloading the installation data and a local connection independent of a communications provider network may then be established between the first network device and the portable computing device. The local connection may include a local wireless connection, a local wired connection, or any combination thereof.

Moving to block 304, the portable computing device receives data from the first network device relating to the configuration of the first network device. For example, the portable computing device may receive data indicating a jumper settings arrangement of the first network device, a version of software stored at the first network device, one or more expansion cards installed at the first network device, or any combination thereof.

Proceeding to decision block 306, the portable computing device determines if the first network device is configured according to a communications provider specification. The communications provider specification may relate to providing at least one communications service, such as a High Speed Internet service, a Voice over Internet Protocol (VoIP) service, an Internet Protocol Television (IPTV) service, or any combination thereof, to one or more subscriber premises. The communications provider specification may indicate a specified version of software for the first network device, a specified jumper setting arrangement of the first network device, a specified expansion card identifier of the first network device, or any combination thereof. In an illustrative embodiment, the portable computing device may determine if the first network device is configured according to the communications provider specification by comparing the specified version of software instructions to software instructions stored at the first network device, by comparing the specified jumper settings arrangement to a first network device jumper settings arrangement, by comparing the specified expansion card identifier to a first network device expansion card identifier, or any combination thereof.

When the portable computing device determines that the first network device is not configured according to the communications provider specification, then the method proceeds to block 308. At block 308, a graphical user interface is provided at the portable computing device indicating configuration instructions related to configuring the first network device according to the communications provider specification. For example, the graphical user interface may include configuration instructions indicating that a new version of software needs to be replace a current version of software at the first network device, that an expansion card of the first network device needs to be replaced by a specified expansion card, that the jumper settings of the first network device need to modified to a specified arrangement of jumper settings, or any combination thereof.

Proceeding to block 310, the portable computing device receives data from the first network device relating to changes in the configuration of the first network device based on the configuration instructions. For example, the portable computing device may receive data from the first network device indicating that the jumper settings of the first network device have been modified based on the jumper settings arrangement specified by the configuration instructions. The method returns to block 306 to determine if the first network device is configured according to the communications provider specification.

When the portable computing device determines that the first network device is configured according to the communications provider specification, then the method proceeds to block 312. At block 312, the portable computing device sends the script included in the installation data to the first network device. The method terminates at 314.

Figure 4:
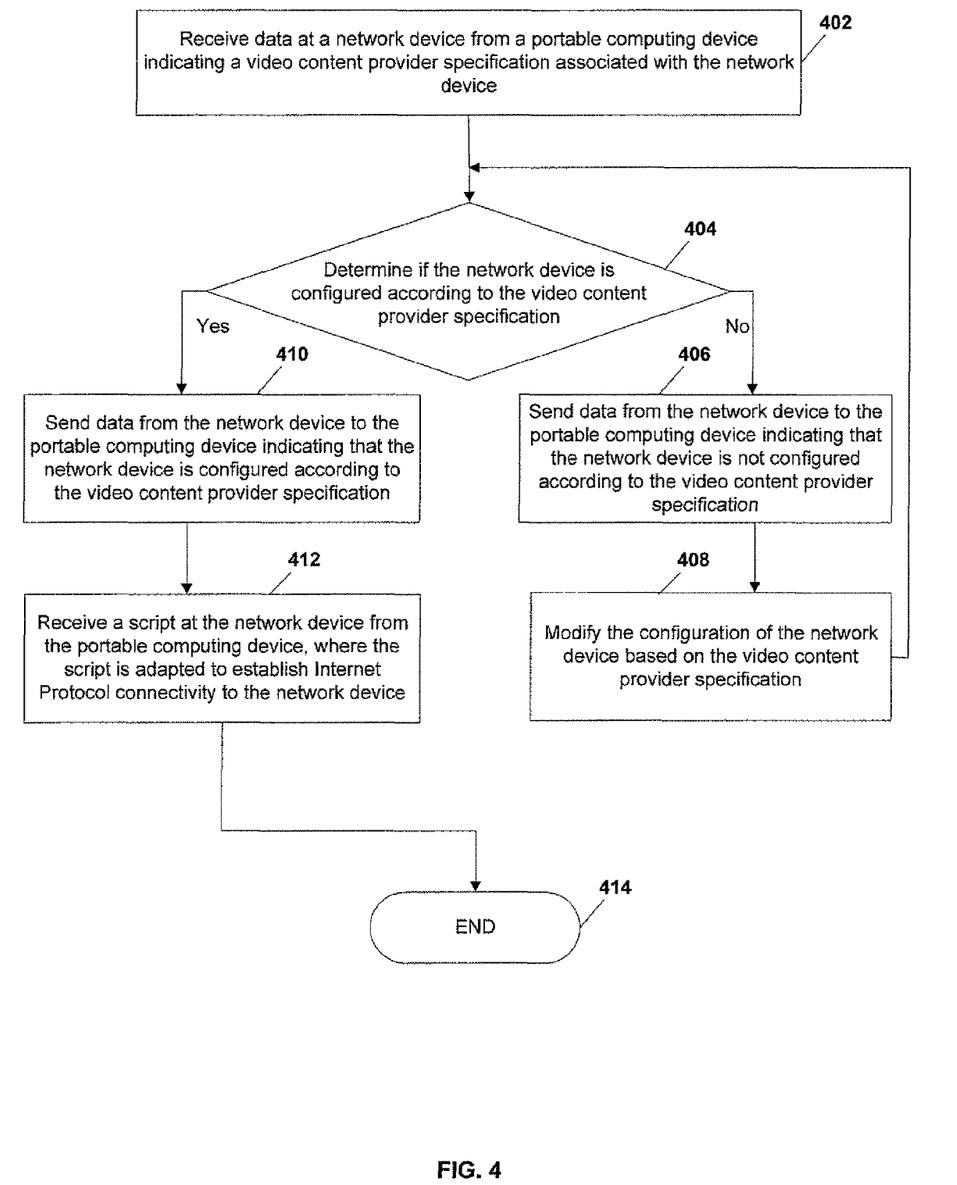
FIG. 4 is a flow diagram of a second particular embodiment of a method of installing a network device.

FIG. 4 is a flow diagram of a second particular embodiment of a method to install a network device. At block 402, a network device receives data from a portable computing device indicating a video content provider specification associated with the network device. The video content provider specification may relate to a particular configuration of the network device to provide Internet Protocol Television (IPTV) service to one or more set-top box devices. In an illustrative embodiment, the network device may include an access switch, router or server, a distribution switch, router, or server, a set-top box device, customer premises equipment, or any combination thereof.

Moving to decision block 404, the network device determines if the network device is configured according to the video content provider specification. When the network device is not configured according to the video content provider specification, the method proceeds to block 406. At block 406, the network device sends data to the portable computing device indicating that the network device is not configured according to the video content provider specification. Proceeding to block 408, the configuration of the network device is modified based on the video content provider specification. For example, the jumper settings of the network device may be modified based on jumper settings specified by the video content provider specification, an expansion card of the network device may be replaced by an expansion card specified by the video content provider specification, a version of software at the network device may be replaced by a version of software specified by the video content provider specification, or any combination thereof. The method returns to block 404 to determine if the network device is configured according to the video content provider specification.

When the network device is configured according to the video content provider specification, the method proceeds to block 410. At block 410, the network device sends data to the portable computing device indicating that the network device is configured according to the video content provider specification. Proceeding to block 412, the network device receives a script from the portable computing device. The script may be adapted to establish Internet Protocol (IP) between the network device and the one or more set-top box devices. In addition, the script may be unique in that the script is only adapted to establish IP connectivity between a particular network device and a particular group of set-top box device. For example, the script may identify the one or more set-top box devices, information related to facilitating IPTV service to the one or more set-top box devices, an IP address assigned to the particular network device, or any combination thereof. The method terminates at 414.

According to particular embodiments, a network device is installed according to a communications provider specification. A communications provider technician can execute software stored at a portable computing device to confirm that the network device is configured correctly and to activate the network device to provide communications services to one or more subscriber premises during the same session. Errors in the configuration of the network device can be corrected locally without relying on a remote connection with a communications provider network server.

Figure 5:
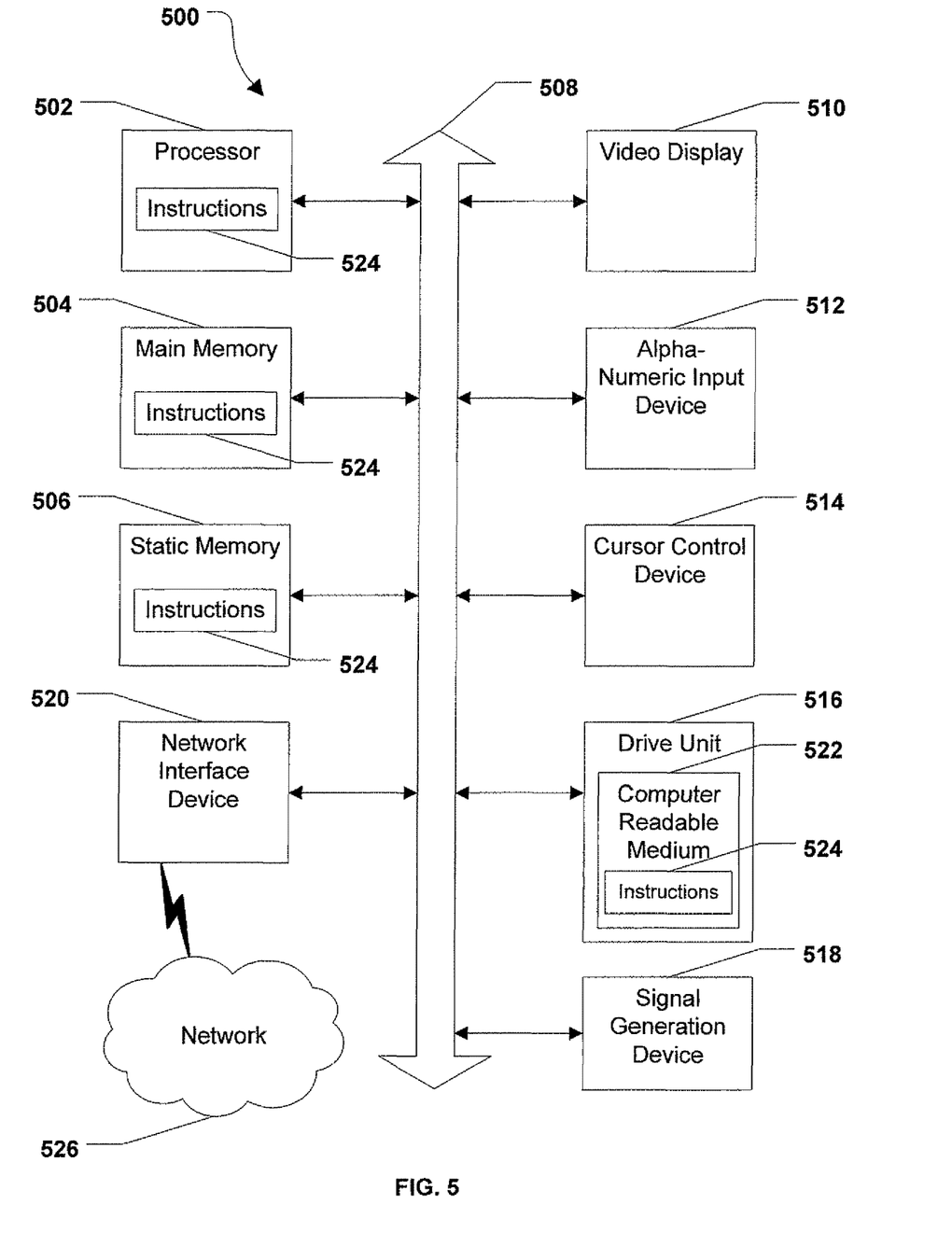
FIG. 5 is a block diagram of an illustrative embodiment of a general computer system.

Referring to FIG. 5, an illustrative embodiment of a general computer system is shown and is designated 500. The computer system 500 can include a set of instructions that can be executed to cause the computer system 500 to perform any one or more of the methods or computer based functions disclosed herein. The computer system 500, or any portion thereof, may operate as a standalone device or may be connected, e.g., using a network, to other computer systems or peripheral devices, including a communications provider server; a network device, such as an access switch, router, or server, a distribution switch, router, or server, a customer premises equipment unit, or a set-top box device; or a portable computing device as shown in FIGS. 1-2.

In a networked deployment, the computer system may operate in the capacity of an IPTV server, such as a video server or application server, or a set-top box device. The computer system 500 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 500 can be implemented using electronic devices that provide voice, video or data communication, Further, while a single computer system 500 is illustrated, the term "system" shall also be taken to include any collection of systems or sub-systems that individually or jointly execute a set, or multiple sets, of instructions to perform one or more computer functions.

As illustrated in FIG. 5, the computer system 500 may include a processor 502, e.g., a central processing unit (CPU), a graphics-processing unit (GPU), or both. Moreover, the computer system 500 can include a main memory 504 and a static memory 506 that can communicate with each other via a bus 508. As shown, the computer system 500 may farther include a video display unit 510, such as a liquid crystal display (LCD), an organic light emitting diode (OLED), a flat panel display, a solid state display, or a cathode ray tube (CRT). Additionally, the computer system 500 may include an input device 512, such as a keyboard, and a cursor control device 514, such as a mouse. The computer system 500 can also include a disk drive unit 516, a signal generation device 518, such as a speaker or remote control, and a network interface device 520.

In a particular embodiment, as depicted in FIG. 5, the disk drive unit 516 may include a computer-readable medium 522 in which one or more sets of instructions 524, e.g. software, can be embedded. Further, the instructions 524 may embody one or more of the methods or logic as described herein. In a particular embodiment, the instructions 524 may reside completely, or at least partially, within the main memory 504, the static memory 506, and/or within the processor 502 during execution by the computer system 500. The main memory 504 and the processor 502 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 524 or receives and executes instructions 524 responsive to a propagated signal, so that a device connected to a network 526 can communicate voice, video or data over the network 526. Further, the instructions 524 may be transmitted or received over the network 526 via the network interface device 520.

While the computer-readable medium is shown to be a single non-transitory storage medium, the term "computer-readable medium" includes a single medium or multiple media, such as a centralized or distributed database, and/or associated caches and servers that store one or more sets of instructions. The term "computer-readable medium" shall also include any non-transitory storage medium that is capable of storing, encoding or carrying a set of instructions for execution by a processor or that cause a computer system to perform any one or more of the methods or operations disclosed herein.

In a particular non-limiting, exemplary embodiment, the non-transitory computer readable storage medium can include a solid-state memory such as a memory card or other package that houses one or more non-volatile read-only memories. Further, the non-transitory computer storage medium can be a random access memory or other volatile re-writable memory. Additionally, the computer-readable medium can include a magneto-optical or optical medium, such as a disk or tapes or other storage device. A digital file attachment to an e-mail or other self-contained information archive or set of archives may be considered a distribution medium that is equivalent to a tangible storage medium. Accordingly, the disclosure is considered to include any one or more of a non-transitory computer readable medium or a distribution medium and other equivalents and successor media, in which data or instructions may be stored.

In accordance with various embodiments, the methods described herein may be implemented as one or more software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component object distributed processing, parallel processing, or virtual machine processing can also be constructed to implement the methods described herein.

It should also be noted that software that implements the disclosed methods may optionally be stored on a tangible storage medium, such as: a magnetic medium, such as a disk or tape; a magneto-optical or optical medium, such as a disk; or a solid state medium, such as a memory card or other package that houses one or more read-only (non-volatile) memories, random access memories, or other re-writable (volatile) memories. The software may also utilize a signal containing computer instructions. A digital file attachment to e-mail or other self-contained information archive or set of archives is considered a distribution medium equivalent to a tangible storage medium. Accordingly, the disclosure is considered to include a tangible storage medium or distribution medium as listed herein, and other equivalents and successor media, in which the software implementations herein may be stored.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less tan all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
    downloading installation data at a portable computing device from a communications provider server via an Internet Protocol (IP) network connection, wherein the installation data includes a script that is adapted to establish IP connectivity between a first network device and at least a second network device to facilitate installation of the first network device on a communications provider network;
    terminating the IP network connection between the portable computing device and the communications provider server;
    establishing a local connection between the first network device and the portable computing device;
    determining, at the portable computing device, when the first network device is configured according to a communications provider specification while the portable computing device is disconnected from communicating with the communications provider server, wherein the communications provider specification relates to providing at least one communications service to one or more customer premises; and
    sending the script from the portable computing device to the first network device via the local connection between the portable computing device and the first network device after determining that the first network device is configured according to the communications provider specification.

2. The method of claim 1, wherein the portable computing device downloads data identifying the communications provider specification from the communications provider server, the communications provider specification indicating a specified version of software, a specified jumper settings arrangement, a specified expansion card identifier, or any combination thereof.

3. The method of claim 2, wherein the portable computing device determines when the first network device is configured according to the communications provider specification by comparing the specified version of software to a version of software stored at the first network device, by comparing the specified jumper settings arrangement to a first network device jumper settings arrangement, by comparing the specified expansion card identifier to a first network device expansion card identifier, or any combination thereof.

4. The method of claim 1, wherein the local connection between the portable computing device and the first network device includes a wireless connection, a wired connection, or any combination thereof.

5. The method of claim 1, wherein the at least one communications service includes a High Speed Internet service, a Voice over Internet Protocol (VoIP) service, an Internet Protocol Television (IPTV) service, or any combination thereof.

6. The method of claim 1, wherein the portable computing device sends data to the communications provider server indicating that the first network device is configured according to the communications provider specification.

7. The method of claim 1, further comprising:
    sending a request from the portable computing device to the communications provider server to download a particular script; and
    receiving an error message at the portable computing device from the communications provider server, the error message indicating that the particular script has already been downloaded to another portable computing device.

8. A method comprising:
    receiving installation data at a network device from a portable computing device, wherein the installation data includes a script that is adapted to establish Internet Protocol (IP) connectivity between the network device and one or more set-top box devices via an Internet Protocol Television (IPTV) network to facilitate installation of the network device on a video content provider network, wherein the script is unique to the network device, and wherein the installation data is related to configuring the network device according to a video content provider specification;
    receiving a stop installing command at the network device from the portable computing device, the stop installing command related to discontinuing installation of the network device;
    receiving a resume installing command at the network device from the portable computing device, the resume installing command related to continuing installation of the network device; and
    sending IP data from the network device to the one or more set-top box devices via the IPTV network after executing the script at the network device.

9. The method of claim 8, wherein the script identifies the one or more set-top box devices, information related to providing IPTV service to the one or more set-top box devices, or any combination thereof.

10. The method of claim 8, wherein the network device sends IP data to the one or more set-top box devices via the IPTV network after executing the script at the network device.

11. A portable computing device, comprising:
    processing logic and memory accessible to the processing logic, the memory including:
        instructions executable by the processing logic to download a first script from a video content provider server, the first script adapted to establish Internet Protocol (IP) connectivity between a first network device and a first group of set-top box devices to facilitate installation of the first network device on a video content provider network;
        instructions executable by the processing logic to determine when the first network device is configured according to a video content provider specification;
        instructions executable by the processing logic to send the first script to the first network device via a local connection with the first network device; and
        instructions executable by the processing logic to download a second script from the video content provider server, the second script adapted to establish IP connectivity between a second network device and a second group of set-top box devices, wherein the first script is unique to the first network device and wherein the second script is unique to the second network device.

12. The portable computing device of claim 11, wherein the memory includes instructions executable by the processing logic to download a second script from the video content provider server, the second script adapted to establish IP connectivity between a second network device and a second group of set-top box devices.

13. The portable computing device of claim 11, wherein the memory includes instructions executable by the processing logic to provide at least one graphical user interface related to installing the first network device.

14. The portable computing device of claim 13, wherein the at least one graphical user interface provides an indication that the first network device is not configured according to the video content provider specification.

15. The portable computing device of claim 14, wherein the at least one graphical user interface provides configuration instructions related to configuring the first network device according to the video content provider specification.

16. The portable computing device of claim 15, wherein the configuration instructions relate to downloading a specified version of software instructions from the portable computing device to the first network device, to modifying first network device jumper settings to correspond to a specified jumper settings arrangement, to replacing a first network device expansion card with a specified expansion card, or any combination thereof.

17. The portable computing device of claim 11, wherein the memory includes instructions executable by the processing logic to provide a quality checklist related to installing the first network device.

18. A network device, comprising:
processing logic and memory accessible to the processing logic, the memory including:
  instructions executable by the processing logic to receive specification data from a portable computing device via a local connection between the network device and the portable computing device, the specification data identifying a video content provider specification associated with the network device;
  instructions executable by the processing logic to send data to the portable computing device indicating whether the network device is configured according to the video content provider specification;
  instructions executable by the processing logic to receive installation data from the portable computing device, wherein the installation data includes a script that is adapted to establish Internet Protocol (IP) connectivity between the network device and a plurality of additional network devices via an Internet Protocol Television (IPTV) network to facilitate installation of the network device on a video content provider network; and
  instructions executable by the processing logic to configure the network device according to the video content provider specification before the network device has started to communicate with the plurality of additional network devices;
  wherein the local connection between the network device and the portable computing device is independent of the IPTV network.

19. The network device of claim 18, further comprising a plurality of expansion card slots, each of the plurality of expansion card slots adapted to support a respective expansion card and each of the plurality of expansion card slots coupled to the processing logic.

20. The network device of claim 19, further comprising a first expansion card adapted to communicate IPTV data with a video content provider server, a second expansion card adapted to provide IPTV service to one or more set-top box devices, or any combination thereof.

21. A non-transitory computer readable storage medium having instructions to cause a processor to execute a method comprising:
  downloading installation data at a portable computing device from a communications provider server via an Internet Protocol (IP) network connection, wherein the installation data includes a script that is adapted to establish IP connectivity between a first network device and at least a second network device to facilitate installation of the first network device on a communications provider network;
  establishing a local connection between the first network device and the portable computing device;
  determining, at the portable computing device, when the first network device is configured according to a communications provider specification while the portable computing device is disconnected from communicating with the communications provider server, wherein the communications provider specification relates to providing at least one communications service to one or more customer premises; and
  sending the script from the portable computing device to the first network device via the local connection between the portable computing device and the first network device after determining that the first network device is configured according to the communications provider specification.

22. The non-transitory computer readable storage medium of claim 21, wherein the first network device includes a router, a switch, a set-top box device, customer premises equipment, or any combination thereof.

23. The non-transitory computer readable storage medium of claim 22, wherein the script includes a first script when the first network device is a switch, the script includes a second script when the first network device is a router, the script includes a third script when the first network device is a set-top box device, and the script includes a fourth script when the first network device is customer premises equipment.

* * * * *